United States Patent [19]

Miller et al.

[11] Patent Number: 6,034,681

[45] Date of Patent: Mar. 7, 2000

[54] DYNAMIC DATA LINK INTERFACE IN A GRAPHIC USER INTERFACE

[75] Inventors: Steven M. Miller, Apex; Binh Quang Nguyen, Cary, both of N.C.; Sandeep K. Singhal, Stanford, Calif.; Rodney A. Smith, Raleigh, N.C.

[73] Assignee: International Business Machines Corp., Armonk, N.Y.

[21] Appl. No.: 08/169,570

[22] Filed: Dec. 17, 1993

[51] Int. Cl.[7] ........................................ G06F 3/14
[52] U.S. Cl. ................................................ 345/333
[58] Field of Search .......................... 395/160, 156, 395/155, 161, 800, 164, 157

[56] References Cited

U.S. PATENT DOCUMENTS

| 5,309,555 | 5/1994 | Akins et al. | 395/157 |
| 5,315,703 | 5/1994 | Matheny et al. | 395/164 |
| 5,345,550 | 9/1994 | Bloomfield | 395/156 |
| 5,367,633 | 11/1994 | Matheny et al. | 395/164 |
| 5,408,603 | 4/1995 | Van De Lavoir et al. | 395/161 |

*Primary Examiner*—Ruay Lian Ho
*Attorney, Agent, or Firm*—Gregory M. Doudnikoff

[57] ABSTRACT

A method and system for graphically indicating dynamic data links between a plurality of data objects, which are displayed in a data processing system, wherein the data processing system includes a graphic user interface environment for providing dynamic data exchange utilizing the dynamic data links between the data objects. The method and system includes displaying at least one connection icon in association with each of the data objects that are capable of providing dynamic data exchange utilizing dynamic data links. The display of each connection icon is altered in response to a variation in status of a dynamic data link with the associated data object, wherein a graphic indication of dynamic data links in the data processing system is provided.

29 Claims, 13 Drawing Sheets

DYNAMIC DATA LINK INTERFACE IN A GRAPHIC USER INTERFACE

BACKGROUND OF THE INVENTION

1. Technical Field

The present invention relates in general to an improved data processing system and in particular to a method and system for displaying data flow in a graphic user interface. Still more particularly, the present invention relates to a method and system for indicating dynamic data links in a graphic user interface.

2. Description of the Related Art

The manipulation of data in a data processing system is well known in the prior art. Data may be manipulated in many ways in a data processing system such as, for example: data accessing, data encoding, data communications, data compression, data conversion, data exchange, data linking, data locking, data manipulation, data mapping, data modeling, and data sorting. The large amounts of data that are available to a user of a data processing system often become overwhelming in magnitude and complexity. These situations may arise in the creation and use of data in a number of different applications.

Most graphic user interfaces (GUIs) allow applications to establish dynamic data links (DDLs) for exchanging data between documents, also known as dynamic data exchange (DDE). Typically, these links allow changes in one application document to be immediately reflected in documents produced in other applications. The term "document", when utilized in this application, refers to any type of data object that may be displayed in a window within a GUI, such as, but not limited to, a word processing document, a design drawing, or a spreadsheet. For example, with reference to FIG. 1, a pictorial representation of documents in which DDE may be provided using DDLs. When a user changes values in spreadsheet document 10, the corresponding changes are immediately made in word processor document 12 and graphing software document 14. If the number 70 in cell 11 associated with "dogs" in spreadsheet document 10 is changed to 80, word processor document 12 would reflect a change from 70% to 80% in the sentence located in section 13. Similarly, the graphing software document 14 would change from 70% to 80% in section 15 and bar 16 would change in height to reflect the new number.

When a dynamic data link (DDL) is present between documents, a document may have one of three forms. A document may be a master document, a slave document, or a companion document when performing interprocess communication and DDE, via a DDL. A master document has a DDL which is referred to as a "master" connection, a slave document has a DDL which is referred to as a "slave" connection, and a companion document has a DDL referred to as a "companion" connection.

Referring now to FIG. 2, pictorial representations of the directions of DDE utilizing DDLs in documents is depicted. The arrows in FIG. 2 are provided for indicating the direction of information exchange between documents and are not graphically displayed to a user. Master document 18, also called a "publisher" or "source", is a document that generates data that is transmitted to another document, slave document 20, through a DDL. From the perspective of master document 18, this DDL is a master connection, and from the perspective of the slave document, the DDL is a slave connection. As a result, changes in data associated with a DDL in master document 18 are reflected in slave document 20. Slave document 20, also called a "subscriber" or "target" is a document that receives data from another document, a master document. Changes in slave document 20, however, are not transmitted to master document 18. Companion documents 21 and 22 both transmit and receive document changes to each other. Thus, any changes made to companion document 21 are reflected in companion document 22, and any changes made to companion document 22 are reflected in companion document 21. Thus, a companion document fulfills the role of a both a master and slave document.

As a result, users of the DDE features provided through DDLs are freed from the task of changing data in multiple documents. DDE integrates all associated documents, thereby providing a more flexible and powerful graphic user interface (GUI) environment.

Existing GUI environments do not have adequate user interfaces to represent the DDLs involved in DDE. When editing a document, users often require knowledge of which other documents are exchanging data with the document in the foreground process. A visual representation of this connection information would be useful to enable users to foresee how changes in one document may affect other documents.

A visual representation for illustrating DDLs to users in a graphic user interface that provides information about active DDLs involving the foreground document is desirable. Such an interface should indicate the nature of each DDL and which documents are linked with the foreground document. Additionally, it would be desirable to indicate which documents in a GUI are capable of DDE. A useful GUI system should be unobtrusive, require minimal screen space, and be easy to utilize. The GUI system should also provide a constant visual indication of which documents affect or are affected by the foreground documents. The GUI system should be updated unobtrusively to reflect changes as DDLs are established and terminated. Also, such a GUI system should provide users with a method for switching directly from one foreground document to any of the linked documents.

Therefore it would be desirable to have an improved method and system for representing DDLs between applications in a GUI environment that is unobtrusive and provides a visual indication about linking capabilities and active DDLs between documents.

SUMMARY OF THE INVENTION

It is therefore one object of the present invention to provide an improved data processing system.

It is another object of the present invention to provide a method and system for displaying data flow in a graphic user interface.

It is yet another object of the present invention to provide a method and system for indicating dynamic data links in a graphic user interface.

The foregoing objects are achieved as is now described. The present invention provides a method and system for graphically indicating dynamic data links between a plurality of objects, which are displayed in a data processing system, wherein the data processing system includes a graphic user interface environment for providing dynamic data exchange utilizing the dynamic data links between the objects. The method and system includes displaying at least one connection icon in association with each of the objects that are capable of providing dynamic data exchange utilizing dynamic data links. The display of each connection icon is altered in response to a variation in status of a dynamic data link with the associated object, wherein a graphic indication of dynamic data links in the data processing system is provided.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention includes a user interface representing DDLs between documents in a GUI. A connections icon is utilized to indicate whether a document is participating in a DDE. Connections pull-down menus are provided to give information about active DDLs, and a connections status cue, via an icon associated with a document, is provided to mark documents exchanging data with the document in the foreground process.

Figure 1:
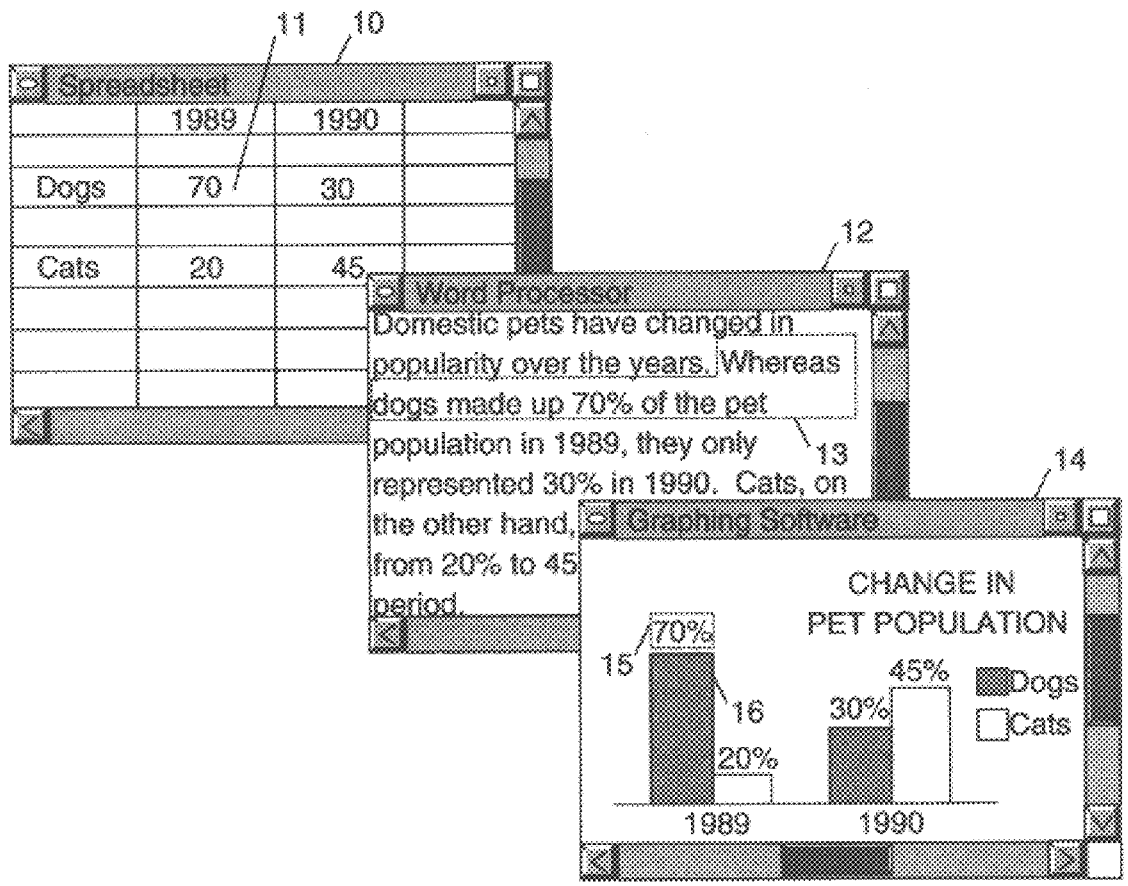
FIG. 1 is a pictorial representation of documents in which dynamic data exchange may be provided using dynamic data links as known in the prior art.
Figure 2:
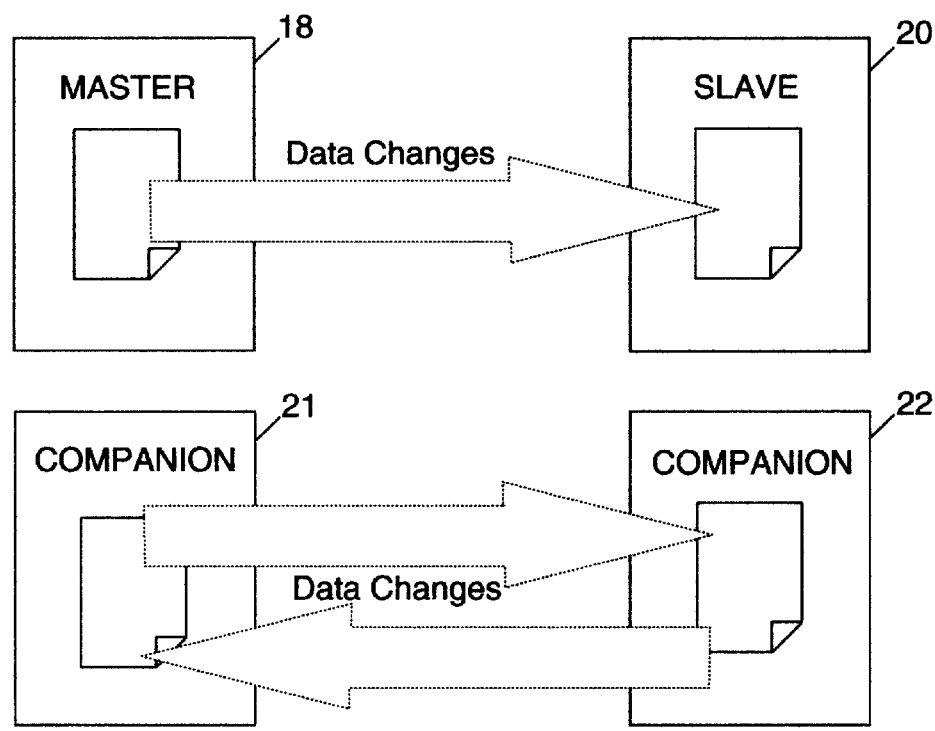
FIG. 2 depicts pictorial representations of the directions of dynamic data exchange utilizing dynamic data links in documents as known in the prior art.
Figure 3A:
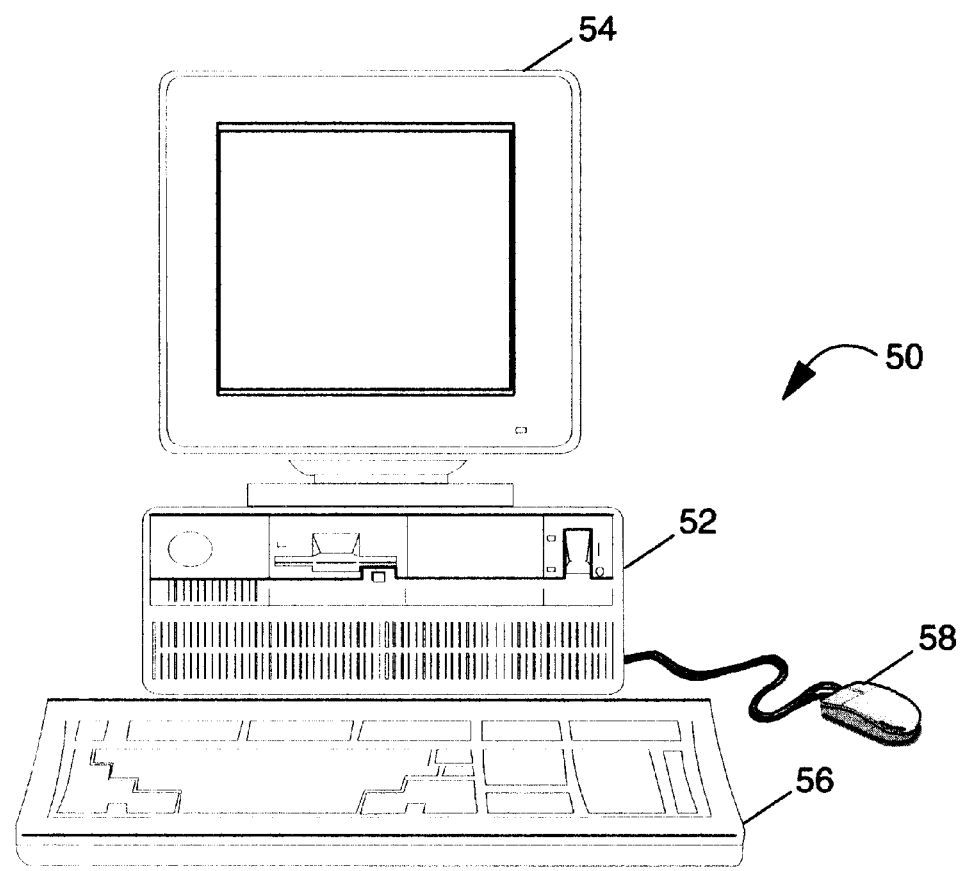
FIG. 3A is a pictorial representation of a data processing system that may be utilized to implement a method and system of the present invention.

With reference now to the figures and in particular with reference to FIG. 3A, a pictorial representation of a data processing system in which the present invention may be implemented is depicted in accordance with a preferred embodiment of the present invention. A data processing system 50 is depicted which includes a system unit 52, a video display terminal 54, a keyboard 56, and a mouse 58. Data processing system 50 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and PS/2 is a registered trademark of International Business Machines Corporation.

Figure 3B:
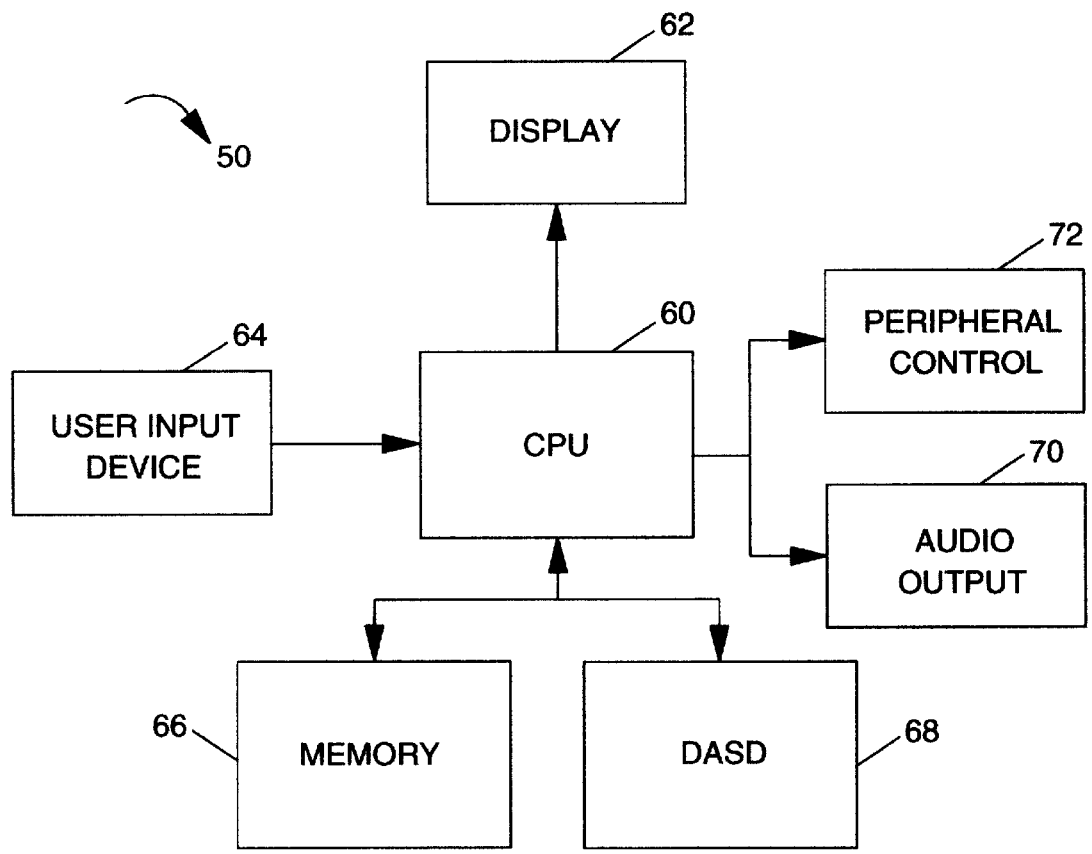
FIG. 3B depicts a block diagram of selected components in the data processing system illustrated in FIG. 1 in which a preferred embodiment of the present invention may be implemented.

FIG. 3B depicts a more detailed high level block diagram, which further illustrates the preferred data processing system 50 of FIG. 3. As illustrated, data processing system 50 is controlled primarily by software executed within central processing unit (CPU) 60. CPU 60 is coupled to display 62, and receives user input from user input device 64. CPU 60 is also coupled to memory 66 and one or more direct access storage devices (DASDs) depicted at block 68. Memory 66 and DASD 68 may be utilized for storing data sets and application programs. User input device 64 may be implemented utilizing one or more of the following: a keyboard, a mouse, a touch sensitive tablet or screen, a joystick, a track ball, or a screen activated light pen. CPU 60 may also be coupled to audio output device 70 and peripheral controller 72. Audio output device 70 may include an amplifier and speaker system. Peripheral controller 72 may be utilized to control peripheral devices, such as a logic analyzer (not shown) or other electronic equipment. In the depicted embodiment of the present invention, CPU 60 is preferably suitably programmed to implement the process depicted in the flowcharts of FIGS. 5–7. A preferred embodiment of the present invention also may be implemented in a computer having a multiple processors or CPUs.

Although the depicted embodiment in FIGS. 3A and 3B employ a personal computer, a preferred embodiment of the present invention may be implemented in other types of data processing systems, such as for example, intelligent work stations, mini-computers, client/server system, or a local area network. For example, a preferred embodiment of the present invention may be implemented in a client/server system or a local area network to provide connection information for documents connected via the client/server system or local area network, but resident in different computers.

Figure 4:
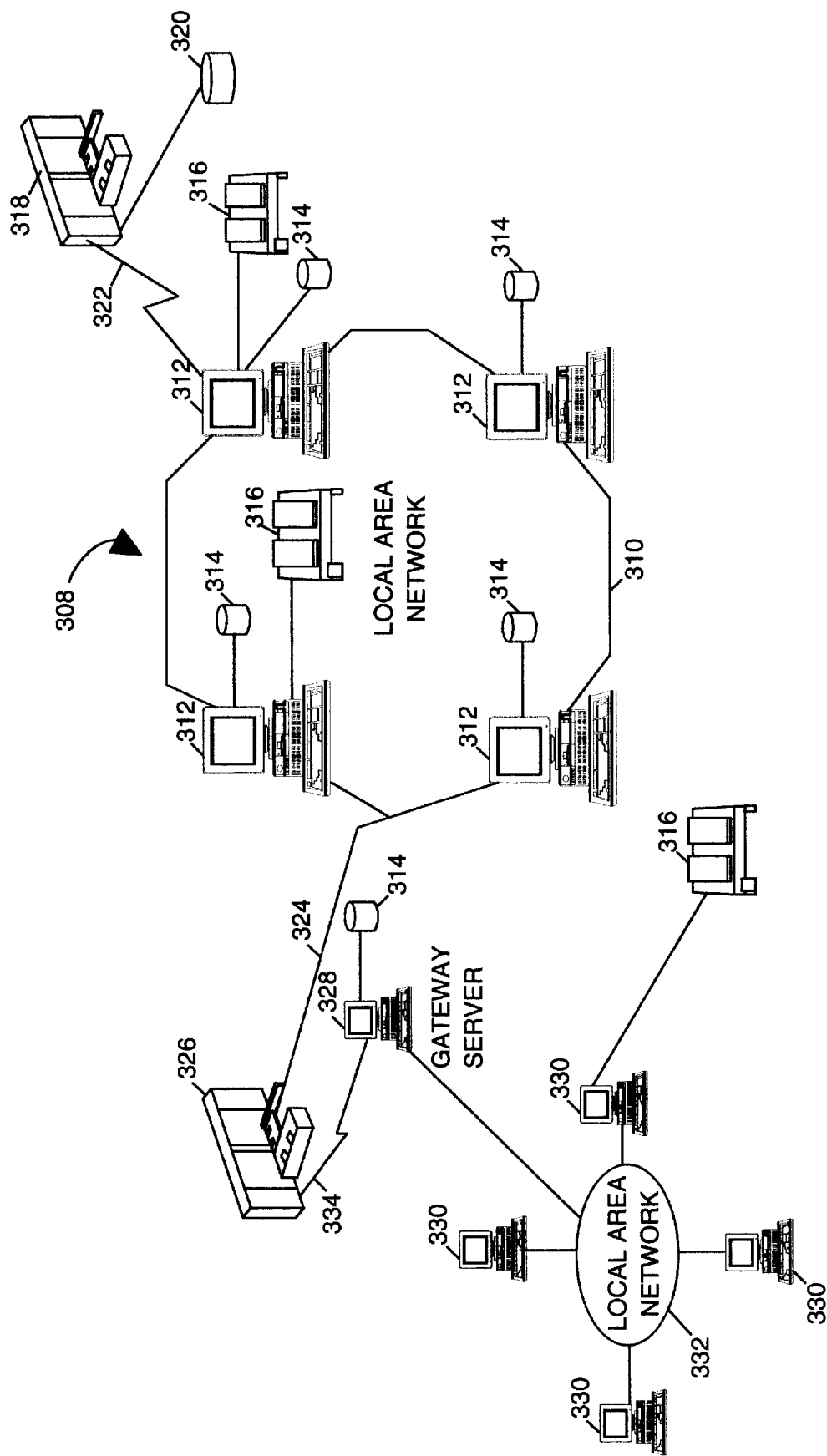
FIG. 4 depicts a pictorial representation of another data processing system that may be utilized to implement a method and system of the present invention.

In particular, with reference to FIG. 4, another data processing system 308 which may be utilized to implement a method and system of the present invention is illustrated. Data processing system 308 includes a plurality of networks, such as local area networks (LAN) 310 and 332, each of which preferably includes a plurality of individual computers 312 and 330, respectively. Computers 312 and 330 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 314 and/or a printer/output device 316. One or more such storage devices 314 may be utilized, in accordance with the method of the present invention, to store documents or resource objects which may be periodically accessed by any user within data processing system 308. In a manner well known in the prior art, each such document or resource object stored within a storage device 314 may be freely interchanged throughout data processing system 308 by transferring a document to a user at an individual computer 312 or 332, for example.

Still referring to FIG. 4, it may be seen that data processing system 308 also may include multiple mainframe computers, such as mainframe computer 318, which may be preferably coupled to LAN 310 by means of communications link 322. Mainframe computer 318 may be implemented utilizing a Enterprise Systems Architecture/370 (also called an "ESA/370") or an Enterprise Systems Architecture/390 (also called an "ESA/390") computer available from IBM. Depending on the application a midrange computer, such as a Application System/400 (also called an "AS/400"), may be employed. "Enterprise Systems Architecture/370", "ESA/370", "Enterprise Systems Architecture/390", and "ESA/390" are trademarks of IBM; "Application System/400" and "AS/400" are registered trademarks of IBM. Mainframe computer 318 also may be coupled to a storage device 320 which may serve as remote storage for LAN 310. Similarly, LAN 310 may be coupled via communications link 324 through a subsystem control unit/communications controller 326 and communications link 334 to a gateway server 328. Gateway server 328 is preferably an individual computer or IWS which serves to link LAN 332 to LAN 310.

As discussed above with respect to LAN 332 and LAN 310, a plurality of documents or resource objects may be stored within storage device 320 and controlled by mainframe computer 318, as Resource Manager or Library Service for the resource objects thus stored. Of course, those skilled in the art will appreciate that mainframe computer 18 may be located a great geographic distance from LAN 310 and similarly LAN 310 may be located a substantial distance from LAN 332. For example, LAN 332 may be located in California while LAN 310 may be located within Texas and mainframe computer 318 may be located in New York.

A graphic user interface (GUI) operating environment may be found on individual computers 312 and 330, on gateway server 328, on some computer in LAN 310 or 332, or on mainframe computer 318. Documents may be located on different computers such as individual computers 312 and 330 wherein DDE is supported and DDLs exist between different documents on different computers. A preferred embodiment of the present invention may be implemented in data processing system 308.

Figure 5:
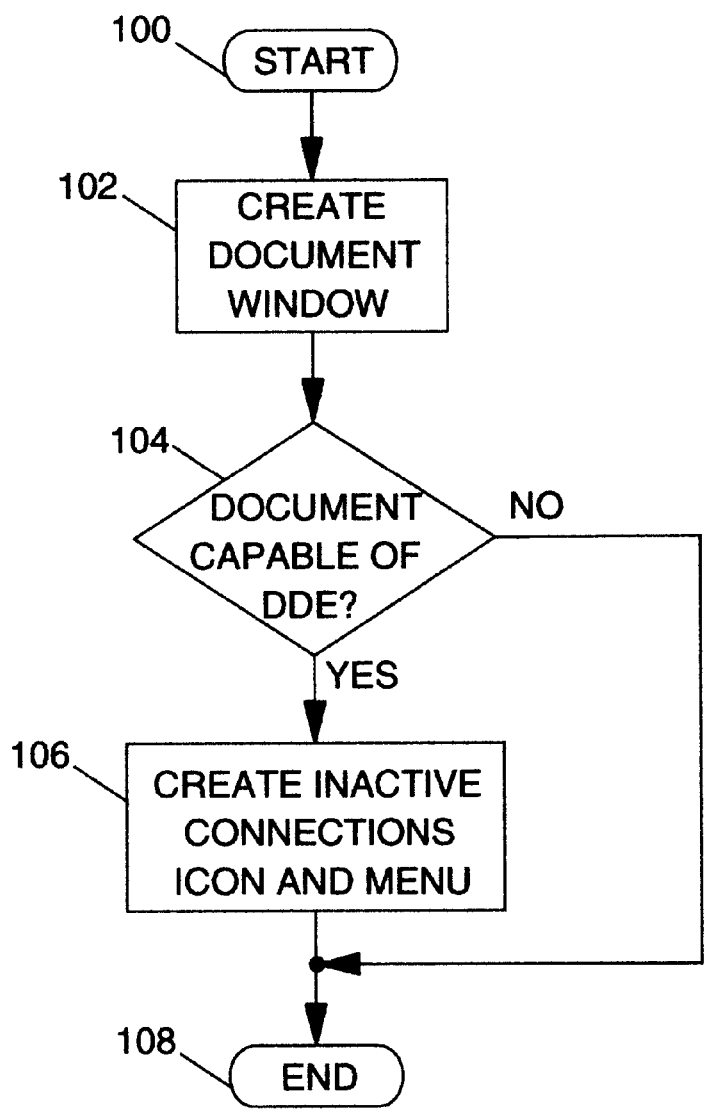
FIG. 5 is a high level flowchart illustrating a process for creating a document window in a graphic user interface for representing dynamic data links between documents in a graphic user interface in accordance with a preferred embodiment of the present invention.

Referring now to FIG. 5, a high level flowchart illustrating a process for displaying a document in a GUI and whether the document is capable of DDE is depicted in accordance with a preferred embodiment of the present invention. The process begins in block 100 and thereafter proceeds to block 102, which illustrates the creation of a document window for displaying a document. Afterward, the process then advances to block 104, which depicts a determination of whether or not the document is capable of DDE. If the document is capable of DDE, the process then proceeds to block 106. Block 106 illustrates the creation of an inactive connections icon and menu for the document. Thereafter, the process terminates as depicted in block 108. Referring again to block 104, if the document is not capable of DDE, the process also terminates in block 108.

Figure 6A:
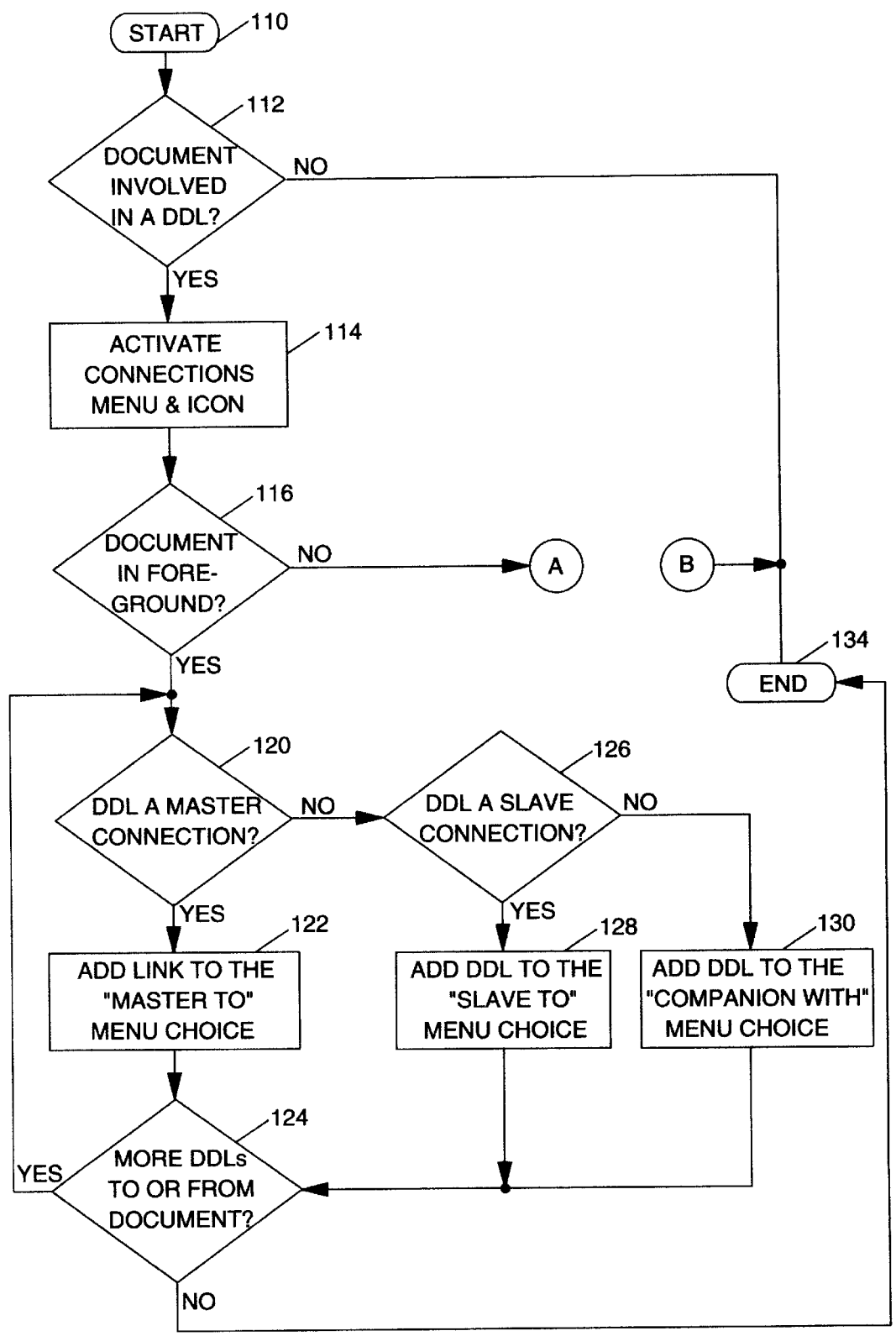
FIGS. 6A and 6B depict a high level flowchart of a process for determining connection types in accordance with a preferred embodiment of the present invention.
Figure 6B:
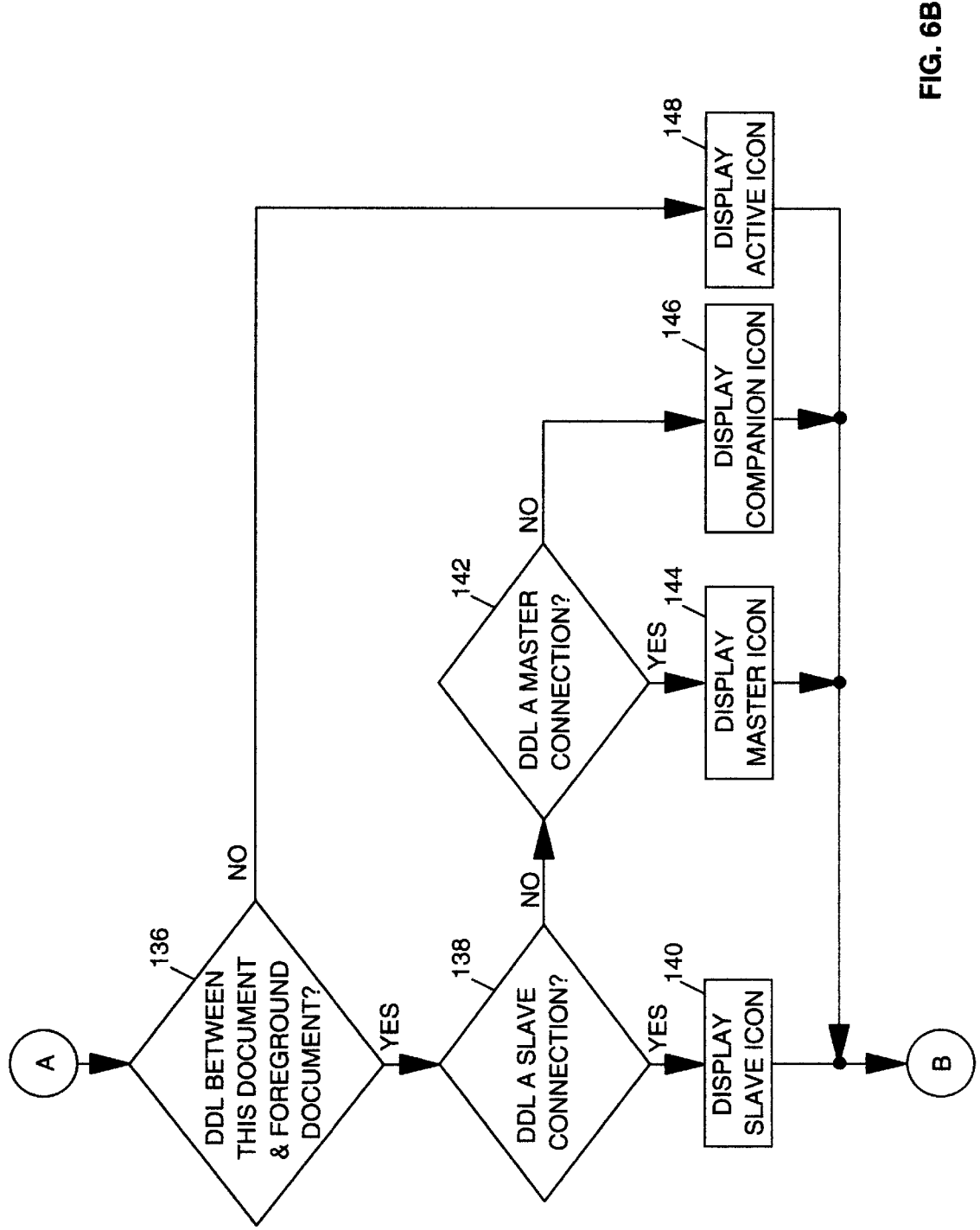

Referring now to FIGS. 6A and 6B, a high level flowchart of a process for determining connection types for a particular document depicted in a GUI is illustrated in accordance with a preferred embodiment of the present invention. This process is employed during and after the initial display of a document in a GUI to determine the DDLs and to monitor changes in DDLs. The process begins as depicted in block 110 and thereafter proceeds to block 112. Block 112 depicts a determination of whether or not the document is involved in or has a DDL. If the document is involved in a data link, the process then advances to block 114, which illustrates the activation of the connections icon and the connections menu. The connections menu includes menu choices indicating connection types, such as, for example, "Master To", "Slave To", and "Companion With" in accordance with a preferred embodiment of the present invention. The process then proceeds to block 116. Block 116 depicts a determination of whether or not the document is in the foreground. At this point, the process determines the type of DDL or DDLs that are associated with the document. If the document is in the foreground, the process then proceeds to block 120, which depicts a determination of whether or not the DDL is a master connection. If the DDL is a master connection, the process then proceeds to block 122. Block 122 illustrates the addition of the DDL to a "Master To" choice in the connections menu. As a result, a selection of the "Master To" choice would cause DDL to be displayed to the user in a second menu. The DDL may be displayed as text describing the DDL in the second menu. Selection of the DDL would result in the highlighting of the window document associated with the DDL.

The user may make a selection using a mouse or other input means. The term "mouse", when utilized in this document, refers to any type of operating system supported graphical pointing device including, but not limited to: a mouse; track ball; light pen; touch screen; and the like. A pointing device, such as a mouse, is typically employed by a user of a data processing system to interact with the data processing system's GUI. A "pointer" is an iconic image controlled by a mouse or other such device, and is displayed on the video display device of a data processing system to visually indicate to the user icons, menus, or the like that may be selected or manipulated.

Next, the process proceeds to block 124. Block 124 depicts a determination of whether or not additional DDLs to or from the document are associated with the document. If additional DDLs are present, the process returns to block 120. If the DDL is not a master connection, the process then advances to block 126, which illustrates a determination of whether or not the DDL is a slave connection. If the DDL is a slave connection, the process then proceeds to block 128, which depicts the adding of a DDL to the "Slave To" choice in the connections menu. The process then advances to block 124.

Referring again to block 126, if the DDL is not a slave connection, the process then proceeds to block 130. Block 130 depicts the addition of the DDL to the "Companion With" choice in the connections menu. Afterward, the process proceeds to block 124 as described above.

Referring back to block 116, if the document is not in the foreground, the process then advances to block 136 in FIG. 6B, via connector A. Block 136 depicts a determination of whether or not a DDL exists between this document and the foreground document. If a DDL exists between this document and the foreground document, the process then advances to block 138, which illustrates a determination of whether or not the DDL is a slave connection. If the DDL is a slave connection, the process then proceeds to block 140. Block 140 depicts the displaying of a slave icon as the connections icon. Afterward, the process terminates in block 134 in FIG. 6A, via connector B.

Referring again to block 138, if the DDL is not a slave connection, the process then advances to block 142. Block 142 illustrates a determination of whether or not the DDL is a master connection. If the determination is yes, the process then proceeds to block 144. Block 144 depicts the displaying of a master icon as the connections icon. Afterward, the process terminates in block 134 in FIG. 6A, via connector B. Referring again to block 142, if the DDL is not a master connection, the process then proceeds to block 146. Block 146 illustrates the displaying of a companion icon as the connections icon. Afterward, the process terminates as illustrated in block 134 via connector B.

Referring again to block 136, if a DDL does not exist between this document and the foreground document, the process then proceeds to block 148. Block 148 depicts the displaying of an active icon as the connections icon, indicating that the document has one or more DDLs, but they are not connected to the foreground document. Afterward, the process again terminates in block 134 in FIG. 6A, via connector B. This process may be employed to determine all the DDLs for documents in the GUI in accordance with a preferred embodiment of the present invention.

Figure 7:
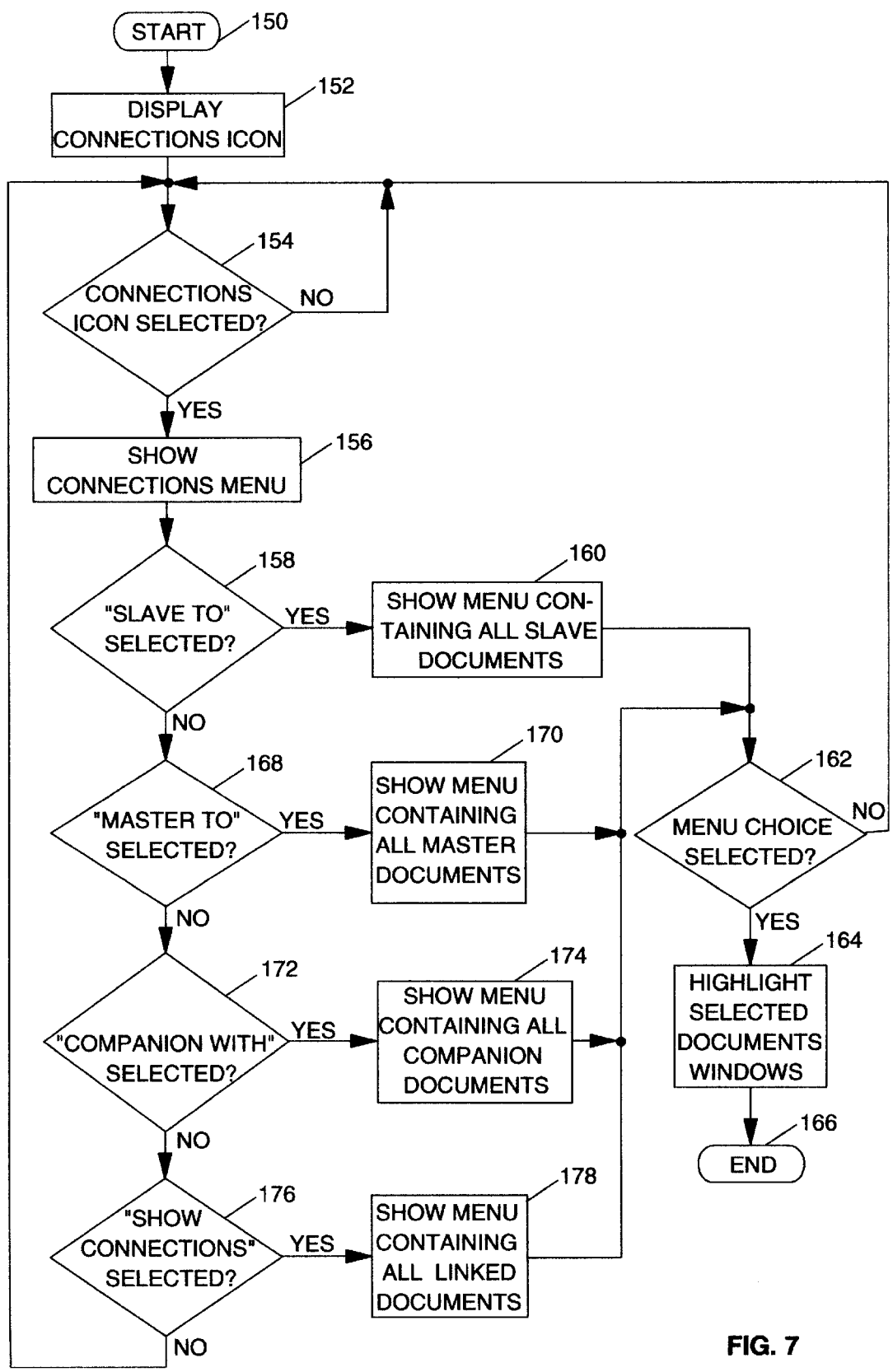
FIG. 7 is a flowchart of a process for providing a graphic user interface to a user in accordance with a preferred embodiment of the present invention.

Referring now to FIG. 7, a flowchart of a process for providing a GUI interface to a user in accordance with a preferred embodiment of the present invention is depicted. As illustrated, the process begins in block 150 and thereafter proceeds to block 152, which depicts the display of a connections icon for a particular document.

Next, the process proceeds to block 154. Block 154 illustrates a determination of whether or not the connections icon has been selected. If the user selects the connections icon, the process advances to block 156, which depicts the showing of the connections menu. The connections menu includes choices for the following menus: "Slave To", "Master To", "Companion With", and "Show Connections" in accordance with a preferred embodiment of the present invention. The process then proceeds to block 158, which depicts a determination of whether or not the user has decided to view slave documents in the "Slave To" menu through a selection of the "Slave To" choice in the connections menu. If the user decides to view slave documents, the process then advances to block 160. Block 160 illustrates the showing of the "Slave To" menu, containing choices representing all of the documents that the foreground document is a slave to in response to a selection of the "Slave To" choice.

Thereafter, the process proceeds to block 162. Block 162 depicts a determination of whether or not the user has selected a menu item. If the user has selected a menu choice, the process then proceeds to block 164, which illustrates the highlighting of selected document window or windows, corresponding to the selected choice. Afterward, the process terminates as depicted in block 166. Referring again to block 162, if the user does not select a choice from the menu, the process then returns to block 154 as described above.

Referring back to block 158, if the "Slave To" is not selected, the process then proceeds to block 168. Block 168 illustrates a determination of whether or not the "Master To" menu has been selected. If the user has selected the "Master To" menu for viewing by selecting the "Master To" choice in the connections menu, the process then proceeds to block 170, which depicts the showing of the "Master To" menu, containing choices of all of the documents that the foreground document is a master to. Thereafter, the process proceeds to block 162 as described above.

Referring again to block 168, if the user does not select the "Master To" menu for viewing, the process then proceeds to block 172, which illustrates a determination of whether or not the "Companion With" menu has been selected by the user for viewing. If the user has selected the "Companion With" menu, the process then proceeds to block 174. Block 174 depicts the showing of the menu containing choices of all of the companion documents to the user. Thereafter, the process proceeds to block 162 as described above.

Referring again to block 172, if the user has not selected the "Companion With" menu for viewing, the process then proceeds to block 176, which illustrates a determination of whether or not the user has selected the "Show Connections" menu to view choices of linked documents. If the user has selected the "Show Connections" menu, the process then advances to block 178, which depicts the showing of the menu containing choices of linked documents to the user. Again, the process then proceeds to block 162 as described above. The choices for linked documents displayed may be all linked documents in the GUI or those documents linked by a DDL to the foreground document in accordance with a preferred embodiment of the present invention.

Referring again to block 176, if the user does not select the "Show Connections" menu, the process returns to block 154. Additionally, if the user in block 154 does not select the connection icon, the process continues to return to block 154.

Figure 8:
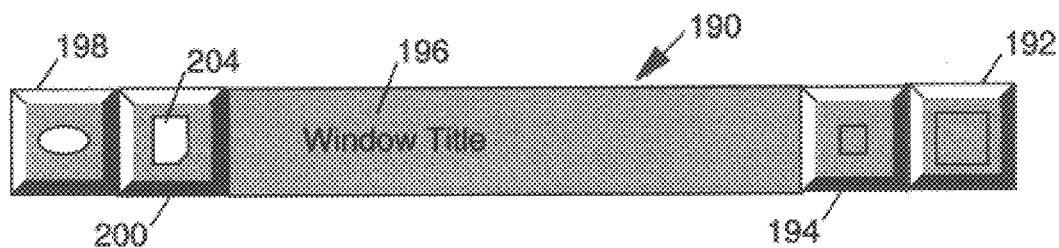
FIG. 8 depicts a pictorial representation of a title bar in accordance with a preferred embodiment of the present invention.

Referring now to FIG. 8, a title bar 190 is illustrated in accordance with a preferred embodiment of the present invention. Title bar 190 includes buttons 192 and 194. Button 192 is utilized to maximize the window containing a document, while button 194 is employed to minimize the window. Section 196 is the window title of title bar 190. Section 198 contains the system menu icon utilized to display a system menu.

Next, section 200 contains a connections icon utilized to indicate the capability of the document associated with title bar 190 for DDE in accordance with a preferred embodiment of the present invention. If a document is involved in a DDL, an active connection icon 204 is displayed to the user in section 200 of title bar 190. The presence of an inactive connections icon 204 or active connections icon 204 in the title bar indicates that the document is capable of dynamic data exchange, and the type of connections icon displayed indicates whether DDE is currently active (whether a DDL is present). Selection of the connections icon results in a menu of connection choices being displayed.

Figure 9:
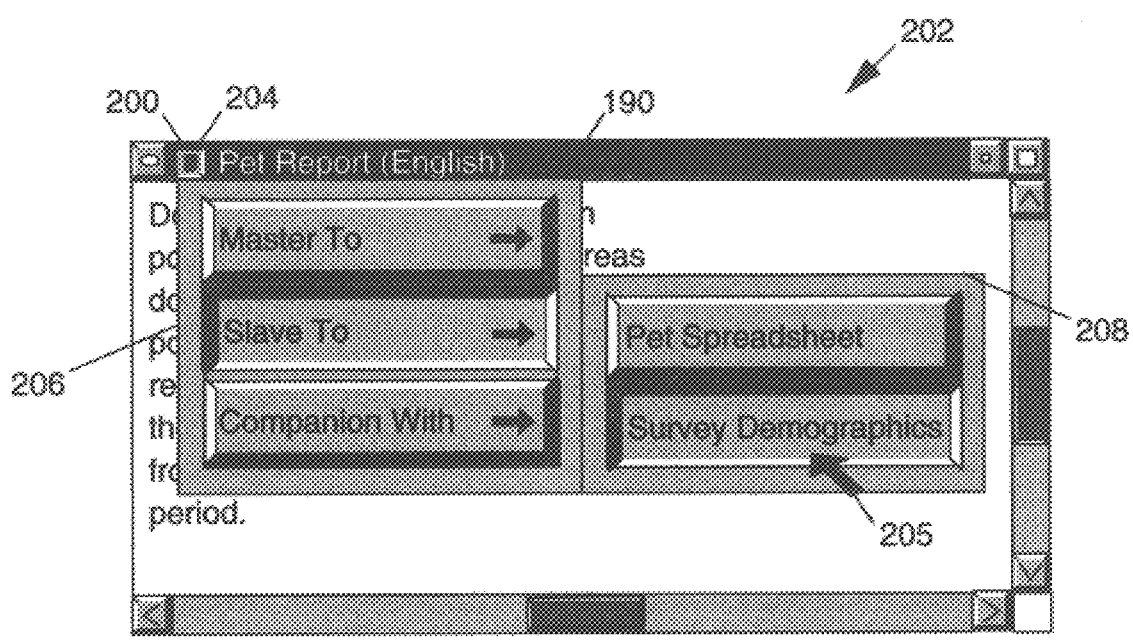
FIG. 9 is an illustration of a document capable of dynamic data exchange with selected menus representing choices for displaying dynamic data links.

Referring now to FIG. 9, an illustration of a document 202 capable of DDE with menus containing choices displaying various connections formed by DDLs is illustrated in accordance with a preferred embodiment of the present invention. A connection icon 204 is depicted within section 200 of title bar 190. Depressing or "clicking" on the connection icon 204 reveals a pull-down menu, connections menu 206, listing the active connections of the document. Connections menu 206 includes the following menu choices: "Master To" for master connections, "Slave To" for slave connections, and "Companion With" for companion connections, representing the three types of DDL connections possible in DDE in accordance with a preferred embodiment of the present invention.

In the depicted embodiment, "Slave To" has been selected and menu 208 is displayed, which indicates that document 202 is a slave to the documents: Pet Spreadsheet and Survey Demographics. In menu 208, the choice "Survey Demographics" has been selected by pointer 205 in the depicted example. In response to this selection, the document "Survey Demographics" is highlighted for display to the user in accordance with a preferred embodiment of the present invention.

Figure 10:
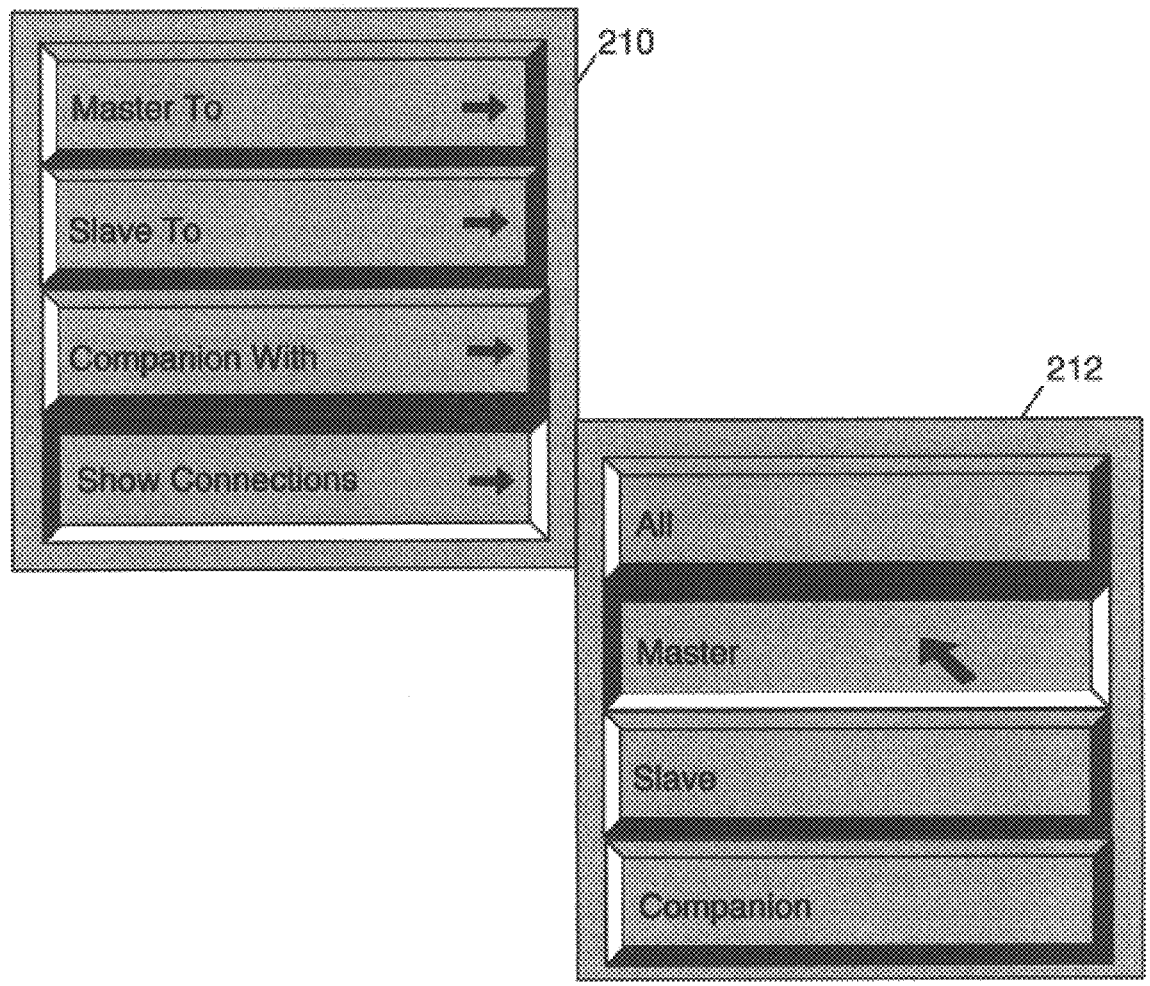
FIG. 10 depicts a pictorial representation of a menu system for showing connections in accordance with a preferred embodiment of the present invention.

Referring now to FIG. 10, a pictorial representation of a menu system for displaying connections in accordance with a preferred embodiment of the present invention is illustrated. Menu 210 includes choices: "Master To", "Slave To", and "Companion With" for displaying various types of connections to a user. Additionally, menu 210 includes a choice called "Show Connections". Selection of the choice "Show Connections" causes the display of menu 212, which includes the options "All", "Master", "Slave", and "Companion" for showing choices representing DDLs.

The selection of a choice by the user displays all connections in the GUI corresponding to the choice in accordance with a preferred embodiment of the present invention. The option "All" shows all connections that the current or foreground document has to other documents. The choice "Master" in menu 212 would show all documents linked in a master mode. The option "Slave" would show all documents linked as a slave document. A selection of the choice Companion shows all documents that are linked to other documents in a companion mode. Documents may be shown by either displaying a list of documents as choices or by highlighting windows and icons in the GUI visible to the user representing documents having links falling within the category selected by the user in accordance with a preferred embodiment of the present invention.

Figure 11A:
FIGS. 11A–11E are illustrations of various connection icons in accordance with a preferred embodiment of the present invention.
Figure 11B:
Figure 11C:
Figure 11D:
Figure 11E:

Referring now to FIGS. 11A–11E, the pictorial illustrations of various connections icons are depicted in accordance with a preferred embodiment of the present invention. Documents incapable of DDE do not display a connection icon in the title bar. Connections icon 216 in FIG. 11A is displayed within section 200 in title bar 190, as depicted in FIG. 8, to indicate documents not currently participating in any DDE, but which are capable of DDE. Connections icon 218 is employed to indicate a foreground application or documents participating in a DDL but not linked to a foreground document. Connections icon 220 is employed to indicate that the document is a companion with the foreground document. Connections icon 222 is utilized to show that the document is a master to the foreground document; connections icon 224 is employed to indicate that the document is a slave to the foreground document.

Utilizing these connections icons, users can easily recognize which other documents are being affected by the foreground document and which other documents are affecting the foreground document while editing a document. A feature of the connections icon provides a desired visual cue to a user. As a document comes through the foreground, all connected documents change their connections icons to different connections icons as shown in FIGS. 11A–11E to reflect a change in status. As mentioned before, the connections icon specifies the nature of the connection. As connections are established, terminated, or changed, the connections icons are updated to show the user the current state of DDLs in the GUI environment.

Figure 12:
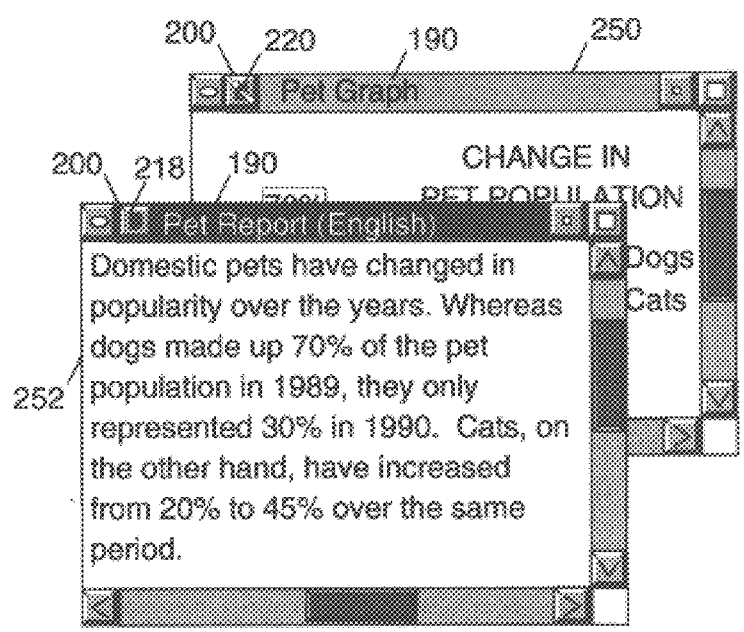
FIG. 12 depicts a pictorial representation of connections between two documents in accordance with a preferred embodiment of the present invention.

Referring next to FIG. 12, a diagram illustrating connections between two documents is depicted in accordance with a preferred embodiment of the present invention. Document 250 is in the background while document 252 is in the foreground. Document 252 includes connections icon 218 in section 200 of title bar 190, which indicates that this document is a foreground document, while document 250 includes connections icon 220, which shows that this document is a companion document to foreground document 252. All documents communicating with the foreground document have arrows in their active connections icon, such as connections icons 220, 222, and 224 depicted in FIGS. 11A–11E in accordance with a preferred embodiment of the present invention.

Figure 13:
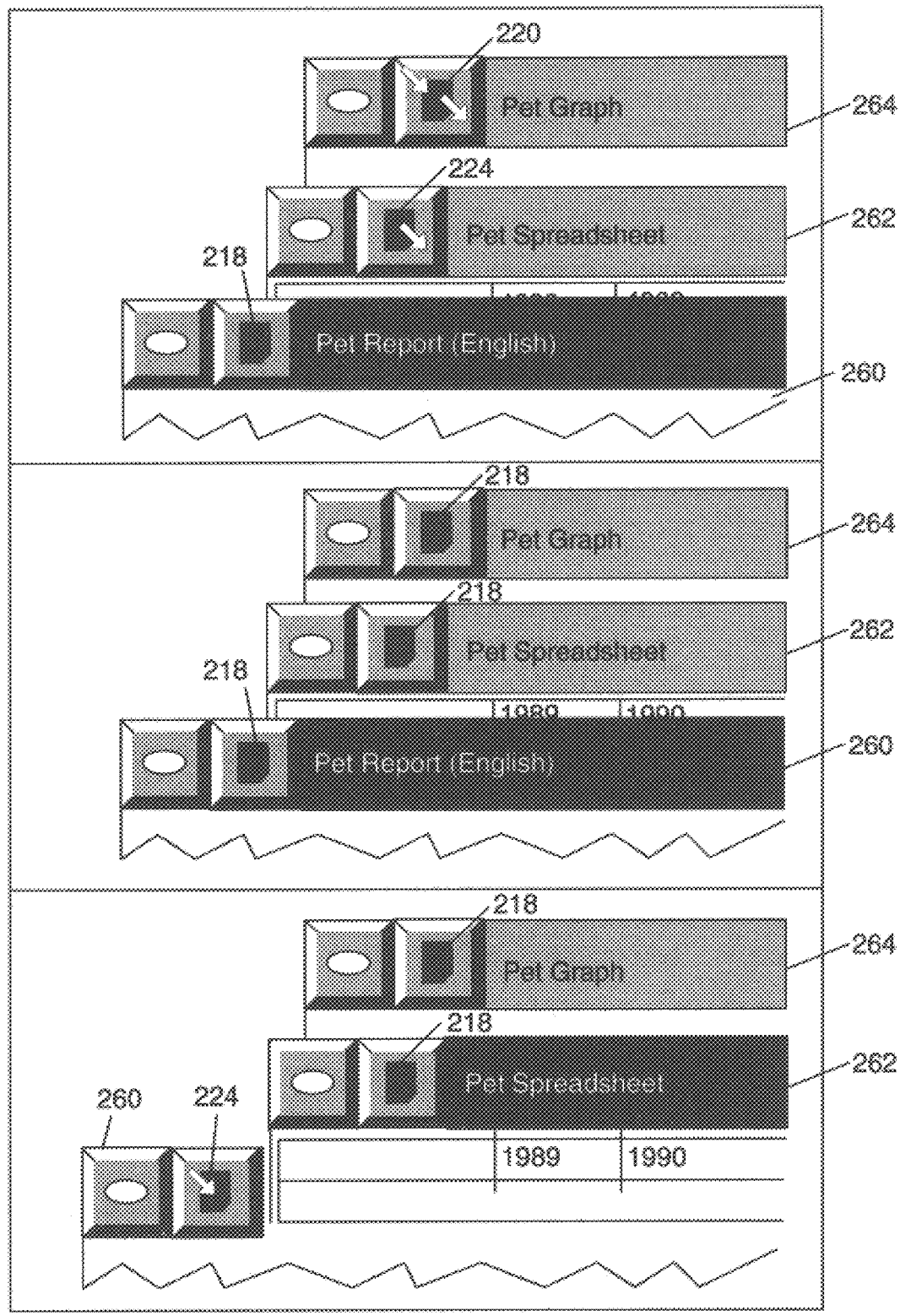
FIG. 13 is a set of illustrations showing various changes in connections icons as a new document is brought to the foreground in accordance with a preferred embodiment of the present invention.

Referring now to FIG. 13, a set of illustrations showing the various changes in connections icons as a new document is brought to the foreground is depicted in accordance with a preferred embodiment of the present invention. Referring to FIG. 13, document 260 is in the foreground while documents 262 and 264 are in the background. Connections icon 218 in document 260 indicates that the document is a foreground document. Connections icon 224 in document 262 indicates that this document is a master to the foreground document 260. Document 264 is a companion document to the foreground document 260 as indicated by connections icon 220.

When document 260 ceases being a foreground document (and documents 262 and 264 are not linked to the new foreground document), the connections icons in documents 262 and 264 change to connections icon 218, indicating that documents are participating in a DDL, but are not linked to the foreground document.

When document 262 is brought to the foreground, the connections icon in document 262 changes to connections icon 218, indicating that document 262 is a foreground document. The connections icon for document 260 changes to connections icon 222, indicating that document 260 is a slave document to foreground document 262. Document 264 has a connections icon 218, indicating that it is a document participating in a DDL, but not linked to document 262.

As a result, the connections icons, pull-down menus, and related user interfaces provide a fundamental technique for representing DDLs in a GUI environment. By employing a preferred embodiment of the present invention, the GUI environment allows users to easily perceive the relationship between various documents. The GUI of the present invention provides flexibility and power without significantly increasing the complexity of the GUI. Thus, a preferred embodiment of the present invention facilitates greater levels of interprocess communications, integrated application environments, and GUI environment consistency.

While the invention has been particularly shown and described with reference to a preferred embodiment, it will be understood by those skilled in the art that various changes in form and detail may be made therein without departing from the spirit and scope of the invention.

What is claimed is:

1. A method for graphically indicating dynamic data links between a plurality of objects in a data processing system, comprising the steps of:

for each object visible in a graphic user interface, displaying at least one connections icons therewith for each object capable of dynamic data exchange using dynamic data links; and altering the icon relative to each of the objects in response to a change in status of a dynamic data link associated with each of the objects.

2. The method of claim 1 further comprising:
detecting a creation of a dynamic data link; and
altering the displayed connections icons associated with objects affected by the created dynamic data link, if necessary.

3. The method of claim 2 further comprising displaying a menu in response to a selection of a connections icon associated with an object.

4. The method of claim 3, wherein the menu includes at least one choice identifying dynamic data links.

5. The method of claim 4, wherein the at least one choice identifies an object having a dynamic data link connected to the associated data object.

6. The method of claim 5, further comprising altering the display of the object in response to a selection of said at least one choice.

7. The method of claim 1 further comprising:
detecting a termination of a dynamic data link; and
altering the displayed connections icons associated with objects affected by the termination of the dynamic data link, if necessary.

8. The method of claim 1 further comprising:
detecting a change in status of an object from background state to a foreground state; and
altering the displayed connections icon associated with the object to indicate the foreground state.

9. The method of claim 1, wherein the objects are capable of both sending and receiving data via the dynamic data links, and changes made to a first object are automatically reflected in a visible representation of a second object which shares data with the first object.

10. The method of claim 1, wherein the objects are documents.

11. A data processing system for graphically indicating dynamic data links between plurality of objects in the data processing system, comprising:
display means for each object visible in a graphic user interface, displaying at least one connections icons therewith for each object capable of dynamic data exchange using dynamic data links; and
alteration means for altering the icon relative to each of the objects in response to a change in status of a dynamic data link associated with each of the objects.

12. The data processing system of claim 11 further comprising:
detection means for detecting a creation of a dynamic data link; and
second alteration means for altering the displayed connections icons associated with objects affected by the created dynamic data link, if necessary.

13. The data processing system of claim 12 further comprising second display means for displaying a menu in response to a selection of a connections icon associated with an object.

14. The data processing system of claim 13, wherein the menu includes at least one choice identifying dynamic data links.

15. The data processing system of claim 14, wherein the at least one choice identifies an object having a dynamic data link connected to the associated data object.

16. The data processing system of claim 15, further comprising third alteration means for altering the display of the object in response to a selection of said at least one choice.

17. The data processing system of claim 11 further comprising:
detection means for detecting a termination of a dynamic data link; and
second alteration means for altering the displayed connections icons associated with objects affected by the termination of the dynamic data link, if necessary.

18. The data processing system of claim 11 further comprising:
detection means for detecting a change in status of an object from background state to a foreground state; and
second alteration means for altering the displayed connections icon associated with the object to indicate the foreground state.

19. A computer program product for graphically indicating dynamic data links between plurality of objects in a data processing system, said computer program product comprising:
first instruction means, for each object visible in a graphic user interface, displaying at least one connections icons therewith for each object capable of dynamic data exchange using dynamic data links; and
second instruction means for altering the icon relative to each of the objects in response to a change in status of a dynamic data link associated with each of the objects.

20. The computer program product of claim 19 further comprising:
third instruction means for detecting a creation of a dynamic data link; and
fourth instruction means for altering the displayed connections icons associated with objects affected by the created dynamic data link, if necessary.

21. The computer program product of claim 20 further comprising fifth instruction means for displaying a menu in response to a selection of a connections icon associated with an object.

22. The computer program product of claim 21, wherein the menu includes at least one choice identifying dynamic data links.

23. The method of claim 22, wherein the at least one choice identifies an object having a dynamic data link connected to the associated data object.

24. The data processing system of claim 23, further comprising sixth instruction means for altering the display of the object in response to a selection of said at least one choice.

25. The computer program product of claim 19 further comprising:
third instruction means for detecting a termination of a dynamic data link; and
fourth instruction means for altering the displayed connections icons associated with objects affected by the termination of the dynamic data link, if necessary.

26. The computer program product of claim 19 further comprising:
third instruction means for detecting a change in status of an object from background state to a foreground state; and
fourth instruction means for altering the displayed connections icon associated with the object to indicate the foreground state.

27. A data processing system for graphically indicating dynamic data links between a plurality of objects in the data processing system, the data processing system comprising:
a first processor;

a video terminal for displaying a graphic user interface;

a first memory associated with the processor, wherein the first memory includes a plurality of objects;

processor means, for each object visible in the graphic user interface, for displaying at least one connections icon therewith for each object supporting dynamic data exchange using dynamic data links; and processor means for altering the icon relative to each of the objects in response to a change in status of a dynamic data link associated with each of the objects.

28. The data processing system of claim 27, further comprising:

a second processor; and a second memory, wherein the second memory includes at least one object having dynamic data link to at least one object in the first memory.

29. The data processing system of claim 28, wherein the first processor and the first memory are located within a first computer in a local area network and the second processor and the second memory are located within a second computer in the local area network.

* * * * *